Dec. 12, 1933.  F. LANG  1,939,454

MOTOR OPERATED STEERING MACHINE

Filed Feb. 18, 1933  2 Sheets-Sheet 1

Inventor
Ferdinand Lang.
By A. J. O'Brien
Attorney

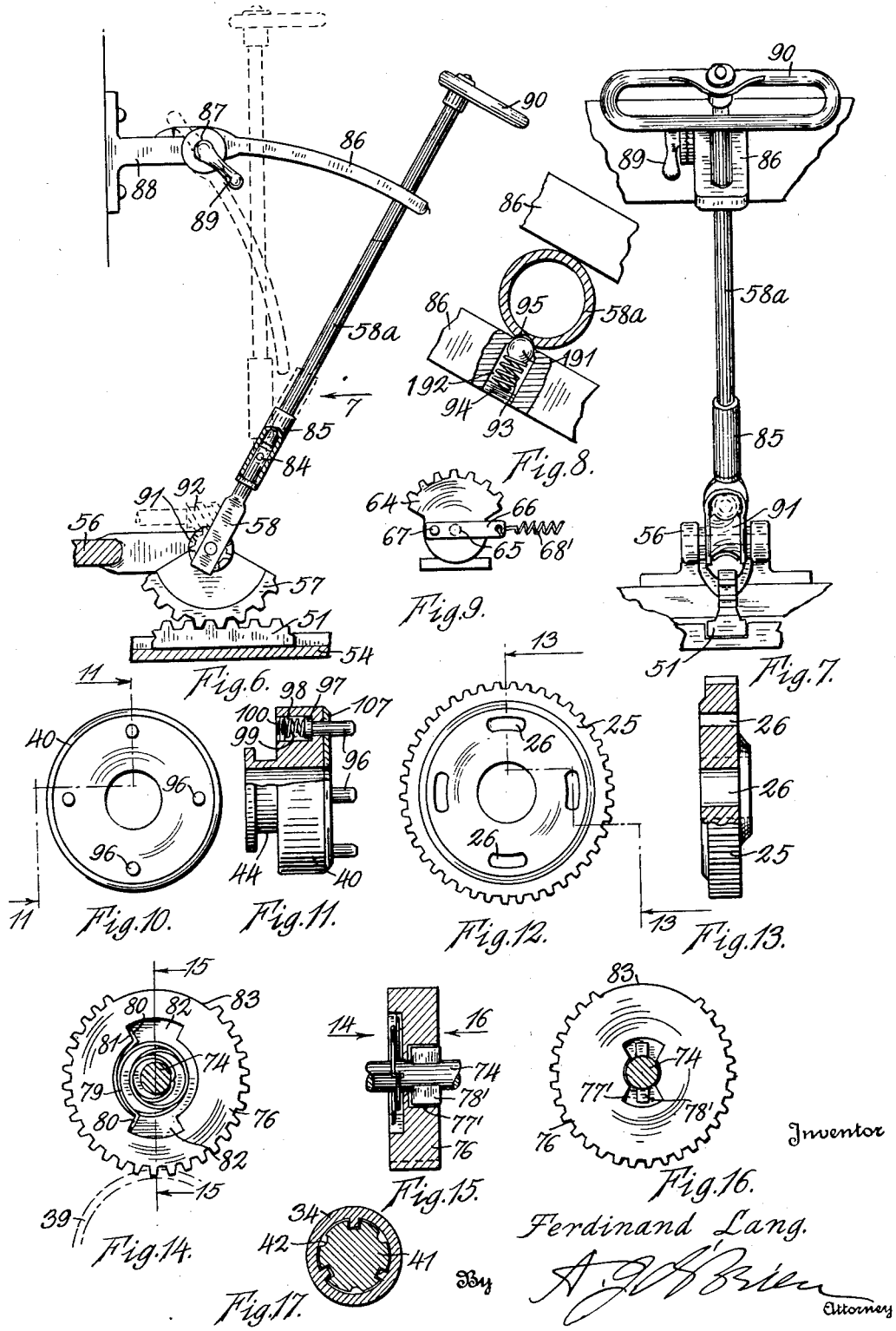

Patented Dec. 12, 1933

1,939,454

UNITED STATES PATENT OFFICE 1,939,454

MOTOR OPERATED STEERING MACHINE

Ferdinand Lang, Jefferson County, Colo.

Application February 18, 1933. Serial No. 657,340

7 Claims. (Cl. 180—79.3)

This invention relates to improvements in motor operated steering mechanisms for automotive vehicles and is an improvement over the device shown and described in my copending application Serial No. 651,174, filed January 11, 1933.

This invention, briefly described, relates to a mechanism which is driven from the crank shaft of the propulsion motor and which is provided with a reversing gear mechanism that in turn operates a crank shaft to the crank arm of which a link is connected. This link is connected with the steering mechanism of the vehicle and by properly shifting the reversing gear the link can be moved in either of two directions, thereby making it possible to steer the vehicle with power derived from the propulsion engine.

Having thus briefly described the invention, the same will now be described in detail and for this purpose reference will be had to the accompanying drawings in which the invention has been illustrated, and in which:

Fig. 6 is a side elevation of the steering handle and associated parts;

Fig. 7 is a view of the steering handle looking in the direction of arrow 7, Fig. 6;

Fig. 8 is a detail, partly in section, showing a detent for holding the steering handle in neutral position;

Fig. 9 is a detail showing part of a device for operating the steering mechanism and for holding the reversing gears in operative position;

Fig. 10 is a plan view of one of the clutch members;

Fig. 11 is a side elevation of the clutch member shown in Fig. 10, parts thereof being shown in section, taken on line 11—11, Fig. 10;

Fig. 12 is a side elevation of one of the rotatable clutch members;

Fig. 13 is a section taken on line 13—13, Fig. 12;

Fig. 14 is a side elevation of one of the transmission gears looking in the direction of arrow 14, Fig. 15;

Fig. 15 is a section taken on line 15—15, Fig. 14;

Fig. 16 is a view looking in the direction arrow 16, Fig. 15; and

Fig. 17 is a section taken on line 17—17, Fig. 2.

Figure 1:
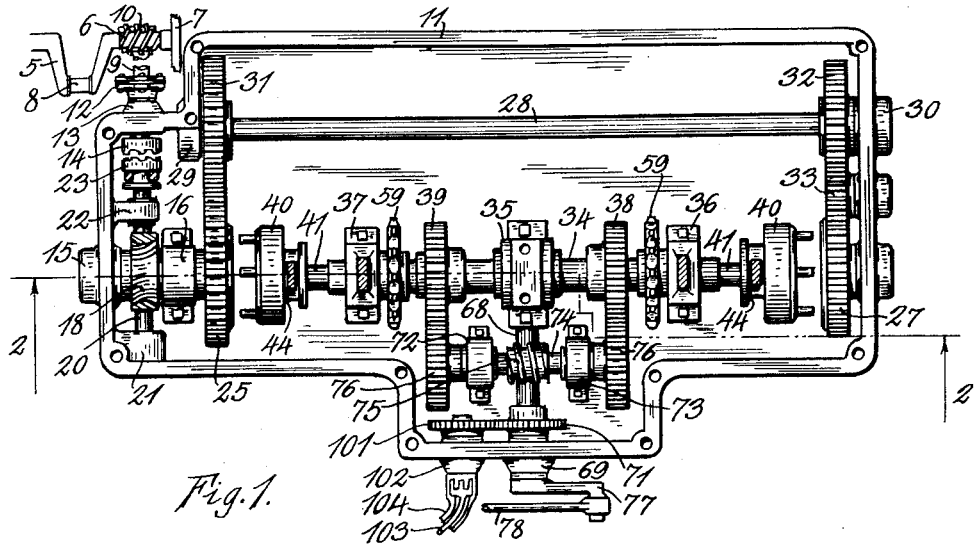
Fig. 1 is a horizontal section taken on line 1—1, Fig. 2.

In the drawings reference numeral 5 indicates the crank shaft of the propulsion motor and this has been shown as provided with a worm 6. The worm is located between the clutch and the first crank arm 8. A shaft 9 extends at an angle to the crank shaft and is provided with a worm gear 10. Located outside of the engine is a casing 11 in which is located the mechanism that forms the subject of this invention. The shaft 9 is provided with a flexible coupling 12 and is journalled in a bearing 13 in the wall of the casing. The inner end of shaft 9 is provided with a clutch member 14.

The casing as shown in the drawings is substantially rectangular in horizontal cross section and is provided at one end with a bearing 15 and spaced from this is another bearing 16. Mounted for rotation in bearings 15 and 16 is a shaft 17. Secured to shaft 17 is a worm gear 18 and this is operatively connected with a worm 19 carried on shaft 20. Shaft 20 is mounted for rotation in bearings 21 and 22 and has secured to one end thereof a clutch member 23 that can be moved into and out of engagement with the clutch member 14. The lever for operating the clutch member 23 has been shown in Fig. 2 where it is indicated by reference numeral 24. Secured to the inner end of shaft 17 is a clutch member and gear 25. The gear 25 is provided with a number of openings 26 that are arcuate and oblong as shown in Figs. 12 and 13. Mounted for rotation about the axis of shaft 17 and at the other end of the casing is another clutch member and gear 27. A shaft 28 extends parallel to the axis of shaft 17 and is mounted for rotation in bearings 29 and 30. Secured to shaft 28 is a gear 31 that meshes with gear 25 and another gear 32 that meshes with an idler 33 which, in turn, meshes with the combined clutch and gear member 27 as shown most clearly in Fig. 3. It is apparent from the description given above that whenever the crank shaft 4 is rotated with the clutch in inoperative position that shaft 17 will be rotated and this, in turn, will rotate the combined gear and clutch member 27 through the intermediary of shaft 28 and gears 31, 32 and 33.

Attention is called to the fact that gears 25 and 27 will rotate in opposite directions, due to the interposition of the idler 33.

A clutch shaft 34 is mounted for rotation in bearings 35, 36 and 37. Shaft 34 is axially aligned with shaft 17 and is preferably tubular or at least provided with an axial opening at each end as indicated by reference numeral 38' in Fig. 2.

Figure 2:
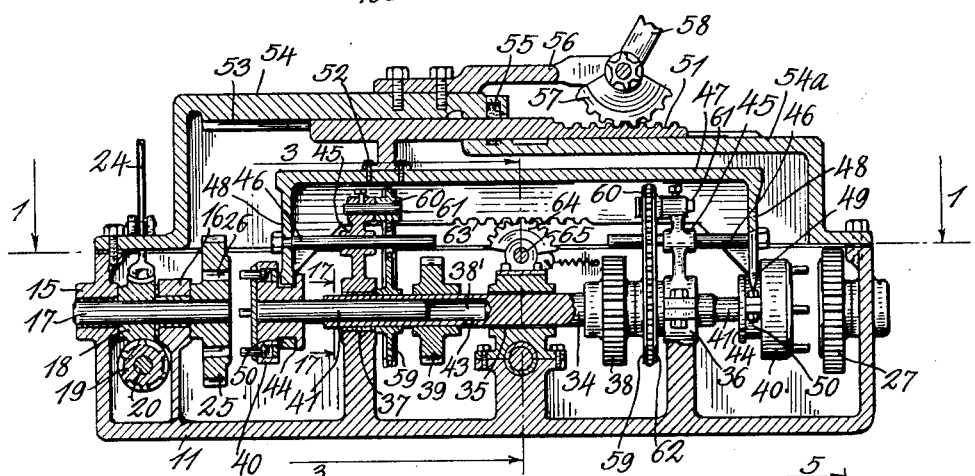
Fig. 2 is a vertical section taken on line 2—2, Fig 1.

Secured to the clutch shaft are gears 38 and 39. Slidably connected with each end of the clutch shaft is a clutch member 40. These members are secured to the outer end of a shaft 41 which is slidable in the opening 38 and has a spline connection with the clutch shaft 34 in the manner shown in Fig. 17. The grooves marked 42 are for lubricating purposes. The walls of the openings 38 are provided with vent openings 43 at their inner ends as shown in Fig. 2. Each of the clutch members 40 is provided with an annular groove 44 to which a shifting mechanism is connected in a manner which will now be described.

The bearings 36 and 27 extend upwardly as shown most clearly in Fig. 2 and are provided above the bearings for the clutch shaft, with bearings 45 in which are slidably mounted the supporting rods 46. In the drawings two separate rods 46 have been shown, but a single rod may be employed if desired. Supported from the ends of rods 46 is a shifting member 47. This shifting member has a horseshoe or inverted U-shape cross section as shown more particularly in Fig. 3. The ends of member 47 are provided with downwardly extending walls 48 whose lower ends have semi-circular bearings 49 that fit into the grooves 44 and are secured to the clutch members by the other cooperating bearing parts 50. When member 47 is shifted lengthwise, it will move both of the clutch members 40 in the same direction and to the same extent as is clearly evident from Fig. 2. For the purpose of shifting the member 47 a rack bar 51 has been attached to it by means of bolts 52 in a manner shown in Fig. 2. This rack bar has its upper surface straight and slides in a groove 53 in the cover 54. The cover is provided with an opening through which the rack bar extends and this opening is surrounded by a stuffing box 55. One end of the cover, which has been designated as 54a, is lower than the other end and the lower surface of the rack bar slides in a groove. Secured to the cover portion 54 is a bracket 56 to which a gear sector 57 is pivotally connected. A handle 58 is connected with the gear sector as shown in Figs. 2, 6 and 7. The construction of the handle and associated parts will be described hereinafter.

Figures 3, 4, 5:
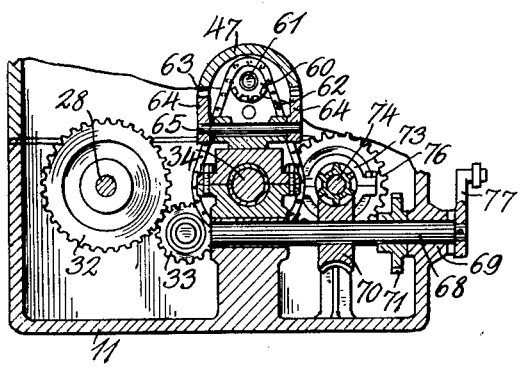
Fig. 3 is a vertical section taken on line 3—3, Fig. 2.
Fig. 4 is a front view of a device for indicating the position of the steering wheels.
Fig. 5 is a section taken on line 5—5, Fig. 4.

For the purpose of lubricating the bars 46, the shaft 34 has been provided with two sprocket wheels 59, and cooperating with these are two other sprocket wheels 60 which are mounted for rotation on a shaft 61 secured to the upper end of bearings 36 and 37. Sprocket chains 62 encircle each pair of sprocket wheels and when shaft 34 is rotated, the sprocket chains will carry oil up over the bars 47 and keep them lubricated. The edges of the shifting member 47 are provided with gear teeth 63 which cooperate with segmental gears 64 as shown in Figs. 2 and 3. The gears 64 are pivotally connected with the shaft 65 and whenever member 47 is shifted longitudinally, they rotate about the axis of shaft 65. Pivotally attached at one end to each wheel 64 is a link 66 and attached to the free end of each link is a spring 68 that is anchored to a stationary portion of the mechanism. Springs 68 are always under tension and when the mechanism is in neutral position, the link extends over the center of axis 65 so as to be in a dead center position, but as soon as member 47 is shifted, the gear segments will be turned slightly with the result that these springs 68' will tend to move the shifting member in the direction in which it was started.

Bearing 35 is provided with an opening for the reception of a shaft 68 whose outer end is journalled in a bearing 69 in the side of the casing. Shaft 68 carries a worm gear 70 as shown in Fig. 3. A gear 71 is also carried by shaft 68. Extending upwardly from the bottom of the casing are two bearings 72 and 73 and journalled in these bearings is a shaft 74. Shaft 74 carries a worm 75 which cooperates with the worm gear 70 on shaft 68. Secured to the outer ends of shaft 74 are two gears 76 which are in mesh with gears 38 and 39. Whenever shaft 34 rotates it will rotate shaft 74 through the intermediary of the gears and shaft 74 will in turn rotate shaft 68 through the worm gear drive. Secured to the outer end of shaft 68 is a crank 77 to which a link 78 is secured. The link is connected with the steering mechanism of the vehicle. By shifting the clutch members 40 into engagement with either of the rotating clutch members 25 or 27, the direction in which the shaft 68 turns can be determined.

Gears 76 have been illustrated in detail in Figs. 14, 15 and 16 from which it will be seen that they have a lost motion connection with the shaft 74. Each of the gears is provided with two sector shaped openings 77' and the shaft 74 has two diametrically extending lugs 78' that project into the openings as shown in Fig. 16. For the purpose of holding the gear in the position shown in Fig. 16, two springs have been provided; these springs have been indicated by reference numeral 79 and have one end secured in an opening in shaft 74 and the other provided with an outwardly extending bent portion 80 that rests on the shoulder 81 of the sector shaped recess 82. The two springs are tensioned so as to produce forces that oppose each other and under normal conditions will hold the gears 76 in the position relative to the shaft shown in Fig. 16. When the parts are in neutral position as shown in Fig. 2, gears 38 and 39 have the position with respect to gears 76 indicated by dotted lines in Fig. 14 and when the parts are operating, gears 38 and 39 can rotate gears 76 substantially one hundred eighty degrees, at which time they arrive at the place indicated by reference numeral 83 which has no cogs and therefore the wheel 76 will not rotate further and this expedient constitutes a limit device. When the wheels 38 and 39 start rotating they first tension the springs 79 until the lugs 78 engage the sides of the recesses 77, whereupon the shaft 74 starts to rotate. As soon as the device is returned to normal position and reversed, the action of the springs will serve to bring the gears 76 into mesh with the cooperating gears 38 and 39.

The handle 58 is made of two parts, the upper of which has been designated by 58a. These two parts are hinged together and connected by a hinge pin 84. A tubular sleeve 85 rests on a collar and serves to hold the two parts of the handle in aligned position. When the sleeve 85 is moved upwardly into dotted line position, the handle can be bent about the hinged pin into dotted line position as shown in Fig. 6. The upper end of the handle extends through a slot in a guide bar 86. This guide bar is pivoted at 87 to a bracket 88. A screw provided with a handle 89 serves to clamp the guide bar in adjusted position to the bracket. When the clamping device is released, the guide bar can be dropped into the dotted line position shown in Fig. 6 and by moving the handie and the guide bar into the dotted line position, they are removed so as to form more room for the operator to enter and to leave the seat. The upper end of the steering bar is provided with a hand wheel 90 which is substantially of the shape shown in Fig. 7. The sector shaped gear 57 is provided with a worm gear 91 that can be used if a worm drive 92 is substituted for the handle.

In Fig. 8 a detent has been shown which comprises a ball 191 that is located in an opening 192 in the guide bar 86. The ball is forced outwardly by a spring 93 that is held in place by a plug 94. One side of the handle has a depression 95 into which the ball 91 enters when the parts are in neutral position and this detent serves to indicate to the operator when the parts are in neutral position and also serves to hold the handle against accidental movement.

Clutch members 25 and 27 are provided with oblong openings as indicated in Figs. 12 and 13 and the longitudinally movable clutch members 40 are provided with a number of movable pins 96 that extend through openings in the same and are provided with heads 97 that are located in the openings 98. Springs 99 tend to force the pins outwardly and these are held in position by means of plugs 100. When the clutch members 40 are moved against the rotating clutch members 25 and 27 the pin enter the openings 26 but if they should strike the surface between the openings, springs 99 will yield and as soon as the parts arrive at a position where the pins register with the openings, the pins will immediately be forced into the openings by the action of the springs.

Since the extent to which the wheels are turned by this steering machine depends on the length of time the clutch remains closed and since the front wheels are sometimes covered by a fender, it becomes necessary to have an indicator in a position where it can be seen by the operator and for this purpose a mechanism has been provided which will now be described. A gear wheel 101 is mounted for rotation in a bearing 102 and meshes with the gear 71. Secured to the outer end of the shaft that is rotated by the gear 101 is a wire 103 that extends through a tube 104 to an indicator housing 105 as shown in Figs. 4 and 5. A pointer 106 is secured to the end of the wire and when the wire is turned, it will also turn the pointer in a direction and to an extent corresponding with the angular movement of the steering wheels. The dial is graduated in two ways from the zero position so that the operator by looking at the indicator can tell the position of the steering wheels at any time.

Each of the movable clutch members 40 is provided with a facing 107 which may be made of heavy belting material, or some other suitable material that will resist the action of oil. The facing 107 prevents the noise which would otherwise occur when clutch members 40 are moved into engagement with the clutch members 25 and 27.

Attention is called to the fact that wheel 90 is not turned in the sense that an ordinary steering wheel is turned, but merely serves as a handle for moving the steering post 58a between full line and the dotted line positions shown in Fig. 6. When the steering post 58a is in the full line position shown in Fig. 6, the clutch member 40 at the left hand end of Figs. 1 and 2 will be located so far to the left that the pins 96 will be in engagement with openings 26 in gear 25 and power will be transmitted from shaft 17 through shaft 34, gears 39 and 76 to shaft 74 and from thence to shaft 68 by means of worm 75 and worm gear 70. When the steering post is moved towards dotted line position it will first disconnect clutch 40 from gear 25 and bring the parts into the neutral position shown in Figs. 1 and 2 at which position the steering post is latched as shown in Fig. 8. When the steering post is moved to its forward position, the clutch at the right in Figs. 1 and 2 will be closed, whereupon shaft 34 will rotate in the opposite direction. The movement of the steering post produces a reciprocation of member 47 and an oscillation of gears 64, as above explained, whereby the springs 68' function to hold the clutches in operative position.

From the above description it will be apparent that I have produced a simple and substantial mechanism that derives its power from the engine of an automotive vehicle and by means of which the vehicle can be steered. When this apparatus is employed, the operator is merely required to control the clutch and the engine will produce the necessary power to turn the wheels, thereby relieving the operator of the heavy strains incident to steering.

This mechanism, although described as probably applicable to tractors and automobiles, is especially well adapted for tanks, heavy trucks and can also be used for ships and boats of different kinds.

Having described the invention what is claimed as new is:

1. A power operated steering machine for use with automotive vehicles having a propulsion motor, comprising, in combination, a casing, two spaced clutch members mounted for rotation about the same axis, means interconnecting the clutch members for transmitting motion from one to the other and for producing relative rotation in opposite directions, means for transmitting power from the propulsion motor to the clutch members, a crank shaft extending through the casing, a crank on the outer end of the shaft, and means for connecting the crank shaft to either of the clutch members whereby it can be turned in either direction, said last mentioned means including a limit stop for controlling the extent of movement of the crank shaft.

2. A power operated steering mechanism for use with automotive vehicles comprising, in combination, a casing, two spaced clutch members mounted for rotation about a common axis, means for interconnecting the two clutch members for transmitting motion from one to the other and for producing relative rotation of the members in opposite directions, two movable clutch members located between the first mentioned clutch members and mounted for rotation about the same axis, means for shifting the movable clutch members so as to connect and disconnect them with and from the adjacent rotating clutch member, a common shaft to which the movable clutch members are slidably connected, a crank shaft extending through the wall of the casing, and means for transmitting power from the shaft carrying the movable clutch members to the crank shaft, said transmitting means comprising a worm gear and a limit stop.

3. A power operated steering mechanism for use with automotive vehicles comprising, in combination, a casing, two spaced clutch members mounted for rotation about a common axis, means for interconnecting the two clutch members for transmitting motion from one to the other and for producing relative rotation of the members in opposite directions, two movable clutch members located between the first mentioned clutch members and mounted for rotation about the same axis, means for shifting the movable clutch members so as to connect and disconnect them with and from the adjacent rotating clutch member, a common shaft to which the movable clutch members are adjustably connected, a crank shaft extending through the wall of the casing, and means for transmitting power from the shaft carrying the movable clutch members to the crank shaft, said transmitting means comprising a worm gear, a lost motion device and a limit stop.

4. A power operated steering mechanism for use with automotive vehicles having a propulsion motor, comprising, in combination, a casing, a shaft mounted for rotation near one end of the casing, a worm gear carried by the shaft, a drive shaft extending through the casing wall, the drive shaft having a worm which cooperates with the worm gear on the other shaft, means for transmitting power from the propulsion engine to the drive shaft, a clutch member secured to one end of the first mentioned shaft, a second clutch member located in the casing and mounted for rotation about the axis of the first shaft, means for transmitting motion from the first mentioned clutch member to the second clutch member and for producing relative rotation of the clutch members in opposite directions, a driven shaft mounted for rotation about the axis of rotation of the rotating clutch members, a clutch member movably secured to each end of the driven shaft and nonrotatably connected therewith, means for shifting the movable clutch members towards and away from the rotating clutch members whereby the driven shaft can be rotated in either direction, a crank shaft extending through the wall of the casing, the outer end of the crank shaft having a crank, and means for transmitting motion from the driven shaft to the crank shaft, whereby the latter can be rotated in either direction by power derived from the engine.

5. A power operated steering mechanism for use with automotive vehicles having a propulsion motor, comprising, in combination, a casing, a shaft mounted for rotation near one end of the casing, a worm gear carried by the shaft, a drive shaft extending through the casing wall, the drive shaft having a worm which cooperates with the worm gear on the other shaft, means for transmitting power from the propulsion engine to the drive shaft, a clutch member secured to one end of the first mentioned shaft, a second clutch member located in the casing and mounted for rotation about the axis of the first shaft, means for transmitting motion from the first mentioned clutch member to the second clutch member and for producing relative rotation of the clutch members in opposite directions, a driven shaft mounted for rotation about the axis of rotation of the rotating clutch members, a clutch member movably secured to each end of the drive shaft, and nonrotatably connected therewith, means for shifting the movable clutch members towards and away from the rotating clutch members whereby the drive shaft can be rotated in either direction, a crank shaft extending through the wall of the casing, the outer end of the crank shaft having a crank, means for transmitting motion from the drive shaft to the crank shaft, whereby the latter can be rotated in either direction by power derived from the engine, said last named means including a limit stop device.

6. A power operated steering mechanism for use with automotive vehicles having a propulsion motor, comprising, in combination, a casing, a shaft mounted for rotation near one end of the casing, a worm gear carried by the shaft, a drive shaft extending through the casing wall, the drive shaft having a worm which cooperates with the worm gear on the other shaft, means for transmitting power from the propulsion engine to the drive shaft, a clutch member secured to one end of the first mentioned shaft, a second clutch member located in the casing and mounted for rotation about the axis of the first shaft, means for transmitting motion from the first mentioned clutch member to the second clutch member and for producing relative rotation of the clutch members in opposite directions, a driven shaft mounted for rotation about the axis of rotation of the rotating clutch members, a clutch member movably secured to each end of the driven shaft, and nonrotatably connected therewith, means for shifting the movable clutch members towards and away from the rotating clutch members whereby the driven shaft can be rotated in either direction, a crank shaft extending through the wall of the casing, the outer end of the crank shaft having a crank, means for transmitting motion from the driven shaft to the crank shaft, whereby the latter can be rotated in either direction by power derived from the engine, said last named means including a limit stop device, and a lost motion connection.

7. A power operated steering machine for use with automotive vehicles having a propulsion motor, comprising, in combination, a casing having a drive shaft extending through an opening in its wall, means for making connection between the motor and the drive shaft, the end of the drive shaft within the casing having a worm, a driven shaft located within the casing and mounted for rotation about an axis that crosses that of the drive shaft at an angle, the driven shaft having a worm gear that cooperates with the worm on the drive shaft, a combined clutch member and gear secured to the end of the driven shaft, a second combined clutch member and gear mounted for rotation about an axis that is coincident with the axis of the driven shaft, a power transmission shaft mounted for rotation about an axis parallel to the axis of the driven shaft, each end of the power transmission shaft having a gear wheel, the gear wheel at one end meshing directly with one of the clutch members and the gear at the other end being connected with the other clutch member by means of an idler whereby the clutch members will be rotated simultaneously in opposite directions, a clutch shaft located between the clutch members and in axial alignment with the driven shaft, a clutch member slidably but nonrotatably connected with each end of the clutch shaft, means for moving either one of the movable clutch members into engagement with one of the rotating clutch members whereby the clutch shaft may be rotated in either direction, a crank shaft extending through a bearing in the side of the casing, a jack shaft mounted for rotation about an axis parallel to the clutch shaft and at an angle to the crank shaft, the latter having a worm gear, the jack shaft having a worm cooperating with the worm gear, the clutch shaft and the jack shaft being each provided with a gear that cooperates with a gear on the other, one of the gears having a segment without gear teeth which serves as a limit stop.

FERDINAND LANG.